May 15, 1923.
W. S. RABB
SHOCK ABSORBER
Filed Aug. 2, 1921
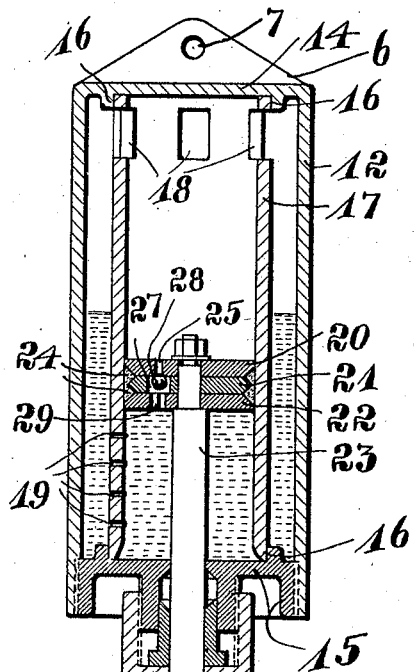
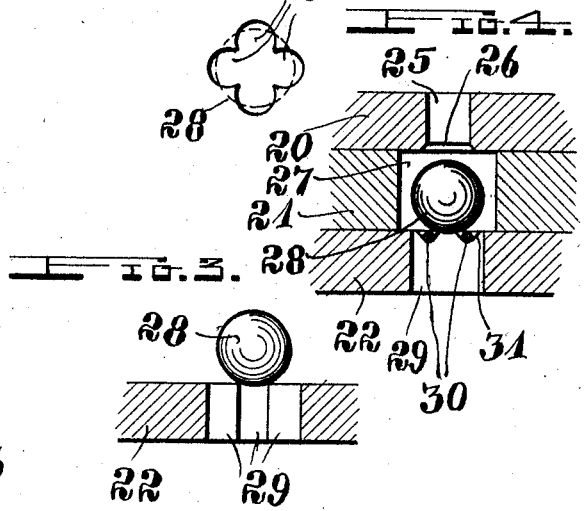
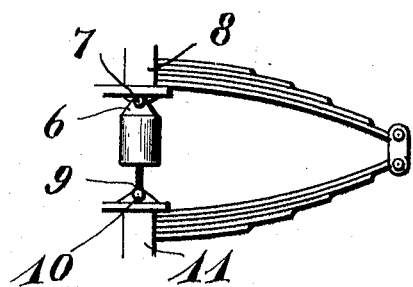
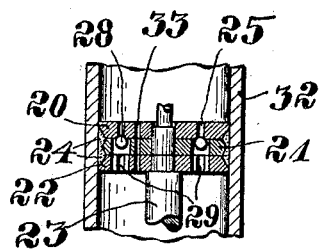
INVENTOR:
WILLIAM S. RABB,
BY: Otto H. Krueger,
his Atty.

Patented May 15, 1923.

1,455,265

UNITED STATES PATENT OFFICE.

WILLIAM S. RABB, OF LOS ANGELES, CALIFORNIA.

SHOCK ABSORBER.

Application filed August 2, 1921. Serial No. 489,175.

*To all whom it may concern:*

Be it known that I, WILLIAM S. RABB, a citizen of the United States, residing at Los Angeles, in the county of Los Angeles and State of California, have invented a new and useful Shock Absorber, of which the following is a specification.

This invention relates to devices for preventing or reducing the recoiling beyond a desired extent, more particularly with reference to vehicle bodies supported by springs on the axles of the vehicle.

One of the objects of this invention is to provide a device which will not influence the softness or capacity of a vehicle spring when the spring is compressed, that is, in the normal downward movement of the vehicle body.

Another object is to provide a device which will allow a vehicle spring to come reasonably quick back to its normal position without causing the vehicle body to rebound unpleasantly.

Another object is to provide a double cylinder, having a piston in the inner cylinder cushioned between oil and air, and having ports suitably connecting the two cylinders.

Other objects will appear from the following description and appended claims as well as from the accompanying drawing, in which—

Fig. 1 is a longitudinal midsectional view of the device.

Fig. 2 is an illustration of an unround hole, preferably used for controlling the ball of a valve within suitable limits, without choking the passage through such a valve, in top plan view.

Fig. 3 is a fragmentary detail midsectional view of a plate provided with a hole corresponding to the illustration in Fig. 2, at a plane at practically right angles to the illustration of Fig. 2, a ball being shown above the hole in the plate.

Fig. 4 is a fragmentary detail midsectional view of a slightly modified form of a ball check valve, having small wires placed in suitable recesses within the surface of one of the plates to hold the ball in proper position between the two outer plates, close to the valve seat in the one plate and preventing an escaping of the ball through the proportionally large hole in the other outer plate.

Fig. 5 is a side elevation of the device disposed between the main portions of vehicle springs.

Fig. 6 is a midsectional view of a slightly modified piston.

A device of this type is normally and preferably attached at one end to a part that is rigidly secured to the body of a vehicle, and at the opposite end to a part that is more rigidly secured to the axle of the same vehicle, for controlling the movement of the axle in relation to the body.

In Fig. 5, the end 6 of the device is illustrated as pivotally engaged at 7 to the yoke 8, holding the spring normally to the body of a vehicle; while the end 9 of the device is illustrated as pivotally engaging at 10 with the yoke 11, normally holding the spring to the axle of the same vehicle.

Such arrangement is, of course, not absolutely necessary, it depends really more on the shape and construction of detail parts of vehicles of different types to make the applying of this device possible, as will easily be understood. In some vehicles, parts may be so designed that the device can be applied directly to the springs, while in other vehicles it may be necessary to apply the device with one end directly to the body of the vehicle and with the opposite end directly to the axle of the vehicle. Such minor changes must be taken care of by the person applying a device of this type, and such minor details and parts of the device are not particularly specified in this application.

The end 6, above referred to, is provided on the outer cylinder 12, illustrated in Fig. 1. The opposite end 9, above referred to, is provided on the piston rod 13 of the device.

In the illustration in Fig. 1, the cylinder 12 is provided with a bottom 14 at one end and with a removable cover-plate 15 at the opposite end. Bottom 14 as well as plate 15 are provided with shoulder members 16, between which the inner cylinder 17 is securely held and sealed. The inner cylinder 17 is provided with port-holes 18 near one end and with other-port-holes 19 near the opposite end. A piston, preferably made up of the several plates 20, 21 and 22, is provided on the inner end 23 of the rod 13. Making the piston of several plates as illustrated, allows a simple provision for packing material between the piston and the cylinder, as indicated at 24. Simple valve constructions are also provided between these several plates, as illustrated in Figs. 1, 2, 3 and 4. The plate 20 is provided with a suitable number of bores or apertures 25, having only one bore shown and indicated in the illustration in Fig. 1 for the sole reason of keeping this illustration as clear as possible, but it will easily be understood that quite a number of such bores may be provided to suit the requirements in providing for a suitable overflow through the piston. Such a bore is preferably provided with a valve seat 26, as illustrated in Fig. 4. The center plate 21 is provided with a suitable number of bores 27, corresponding to the number of bores in the plate 20, so that a ball 28 can be disposed to engage with the seat 26 in the plate 20, leaving ample space for a passage around the ball in the bore 27. The plate 22 is provided with a suitable number of bores 29 to complete the passage through the piston. The bores 29 are preferably of such a shape to retain the balls within the piston without being closable by the balls when the balls are caused to move toward these bores. In Figs. 2 and 3, this bore is illustrated as of uneven or unround shape, so that the ball cannot seal up this bore even when pressed against it. In Fig. 4, a slight modification is illustrated, wires or otherwise suitable members 30 are disposed in recesses 31 within the surface of the plate 21, preventing the ball 28 from falling or getting out of its proper position within the piston.

From the above, it will easily be understood that slight changes may be made, and I wish it understood that I do not limit myself to the specific design of any of the parts of device as illustrated in the accompanying drawing, but only to the principles and principal designs of the parts as claimed.

The double cylinder is preferably partly filled with glycerine, or any other similar suitable matter, and partly with air, providing a soft and yielding cushioning for the piston when moved in one direction while providing a suitable resistance and control for movements of the piston in the opposite direction.

The piston can move quickly in the direction towards the end 14 of the cylinder, the ports 18 being of sufficient size forming a passage from the inner cylinder 17 to the space between the inner cylinder 17 and the outer cylinder 12, besides having the check valve or valves in the piston for a passage directly from above the piston to below the piston, so that there is practically no resistance against a movement of the piston in this direction.

Against a movement of the piston in the opposite direction, however, a very intense resistance is offered, the ports 19 being of suitably small size to allow only a very slow passing of matter from the inner cylinder to the space between the inner cylinder and the outer cylinder 12, besides having the check valve or valves seated on the seat 26, as described above, shutting off the passage through the piston when the piston is moved in this direction towards the end 15 of the cylinder.

A number of ports 19 are provided, arranged so that the piston can move comparatively fast when first commencing in the direction towards the end 15, since all the ports 19 are then free and below the piston, being gradually closed by the moving piston and eventually coming above the piston so that the overflow from the inner to the outer cylinder is suitably choked. This arrangement provides for a free and full action of a vehicle spring when a vehicle body is suddenly jarred downwardly, and allowing also the body to come back to its normal position or to a point near its normal position as long as practically all the ports 19 are free, but suitably retarding the upward recoiling of the body on reaching its normal position.

In the slightly modified form illustrated in Fig. 6, a double cylinder is not necessary, since all the overflows and passages are provided in the piston. The cylinder 32 replaces in this manner both cylinders 12 and 17 of Fig. 1. The cylinder 32 is normally held and connected in a similar manner as described with reference to the illustration in Fig. 1. The piston is made up of the same number of plates 20, 21 and 22, and provided with the same passages 25, controlled by similar balls 28. An extra passage 33 is provided to provide for the slow return of the liquid from one side of the piston to the other side, while the check valves control the larger passages in the opposite direction.

On jerking the piston inwardly, the check-valves open and allow a quick overflow from above the piston to below the piston. A movement in the opposite direction closes the check-valves and compels the liquid to pass through the smaller passage or port 33 from below the piston to above the piston.

Having thus described my invention, I claim:

1. In a shock absorber, a piston made up of several plates having apertures to align in form of passages through the piston, the plate in one end of the piston having apertures to form valve seats, and the plate in the opposite end of the piston having apertures of a shape not to be closed by an inserted valve.

2. In a shock absorber, a piston made up of several plates having apertures to align in form of passages through the piston, the apertures in the plate in one end of the piston being round to form valve seats, and the apertures in the plate in the opposite end of the piston unround to retain but not seat an inserted valve.

3. In a shock absorber, a piston made up of several plates having apertures to align in form of passages through the piston, the apertures in the plate in one end of the piston being round to form valve seats, and the apertures in the other end of the piston being of a size to retain but not close on an inserted valve.

4. In a shock absorber, a piston member having check valve controlling means, a cylinder member having means to receive an inner cylinder spaced from the first-named cylinder, an inner cylinder having proportionally large ports near one end and proportionally smaller ports near the opposite end, the smaller ports being in consecutive order in relation to the longitudinal axis of the cylinder, the check valve controlling means in the piston being disposed to check and close when the piston moves within the cylinder in the direction towards the end with the smaller ports.

5. In a shock absorber, a piston made up of several plates, each plate having apertures to align when the plates are placed together to form passages through the piston, the apertures in the several plates being of differenet size so that a check valve may be maintained between the plates within the passages.

In testimony that I claim the foregoing as my invention I have signed my name in the presence of two subscribing witnesses.

WILLIAM S. RABB.

Witnesses:
 BELLE RABB,
 DOROTHY E. HOWELL.